United States Patent Office 3,639,380
Patented Feb. 1, 1972

---

3,639,380
PREPARATION OF MICROCRYSTALLINE WAXES
Constantinos G. Screttas, Gastonia, N.C., assignor to Lithium Corporation of America, New York, N.Y.
No Drawing. Filed Jan. 24, 1968, Ser. No. 699,994
Int. Cl. C08f *1/74, 3/06*
U.S. Cl. 260—94.9 R     3 Claims

ABSTRACT OF THE DISCLOSURE

Method of preparing microcrystalline waxes by the telomerization of ethylene in the presence of an aromatic or alkyl-aromatic hydrocarbon telogen such as benzene or toluene and of an organolithium-active ether complex such as a butyllithium-tetrahydrofuran complex.

BACKGROUND OF THE INVENTION

The preparation of waxes by telomerizing ethylene in the presence of an aromatic hydrocarbon or an alkyl-aromatic hydrocarbon and a catalyst system in the form of a combination of a nonaromatic tertiary amine with alkyl- or aryllithiums is known, as is shown, for instance, in U.S. Pat. No. 3,206,519. However, cost factors, as well as other shortcomings hereinafter discussed in greater detail, detract from the desirability of such procedures.

SUMMARY OF THE INVENTION

In accordance with the present invention, there is provided a method of producing waxes, notably microcrystalline waxes, by telomerization of ethylene in the presence of aromatic or alkyl-aromatic hydrocarbons employing catalysts in the form of coordination complexes of organolithium compounds and active ethers. As indicated above, the method of this invention provides a number of advantages over prior art methods. Thus, for example, lower reaction temperatures can be used in carrying out the method of this invention with the result that there is less catalyst decomposition and, therefore, longer catalyst lifetimes. Higher contents of microcrystalline components of the wax are commonly obtained through the use of the organolithium-active ether complexes employed in accordance with the present invention than through the use of various previously suggested catalysts. Thus, for instance, and in certain illustrative cases, where the complex utilized was an alkyllithium with tetrahydrofuran, the microcrystalline components of the wax obtained were of the order of 90% or more; whereas, in the same reactions where the complex was that of an alkyllithium with tetramethylethylenediamine, the microcrystalline components of the wax obtained were of the order of 50%. It may also be noted that the organolithium-ether catalyst system utilized in the method of the invention is, generally, more soluble in the reaction medium than is the organolithium-amine catalyst system at equal R-Li to ether ratios. This results in greater homogeneity of the reaction medium and allows for the use of lower reaction temperatures and the attainment of greater overall catalyst efficiency. Also, lower β-values, that is, lower transmetallation to chain propagation ratios, generally can be attained by the method of this invention than is the case where organolithium-amine catalyst systems are employed under equivalent reaction conditions. In addition, the catalysts utilized in the method of the present invention, are, generally speaking, less costly than are the co-catalysts of the organolithium-amine type. These, and other advantages of the method of this invention, will become clear from the detailed description to follow.

DESCRIPTION OF THE PREFERRED EMBODIMENTS

The organolithium compounds employed in forming the catalysts having utility in the practice of the method of this invention most advantageously are alkyllithium compounds such as ethyllithium, n-propyllithium, isopropyllithium, n-butyllithium, isobutyllithium, tert-butyllithium, n-amyllithium, isoamyllithium, n-octyllithium, isooctyllithium, and the like, particularly alkyllithiums containing from 2 to 6 carbon atoms. Polylithio-organic compounds can also be used effectively such as 1,4-dilithiobutane; 1,5-dilithiopentane and other alkylene dilithiums or dilithiopolymethylenes; dilithioisoprene, dilithiobutadiene and other dilithio adducts of conjugated polyene hydrocarbons. Cycloalkyllithium compounds such as, for example, cyclohexyllithium or methylcyclohexyllithium also may be used, but it is especially advantageous to utilize butyllithiums and particularly n-butyllithium. The specific organolithium compound employed influences the rate of the telomerization reaction and also the average molecular weight of the waxy telomer which is obtained.

The ethers which are useful in forming the catalysts employed in the method of this invention can be represented by linear alkyl ethers such as dimethyl ether, diethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol and dimethyl-, diethyl- and diisopropyl ethers of propylene glycol; cyclic alkyl ethers such as tetrahydrofuran (THF), tetrahydropyran (THP), dioxane, and 7-oxa[2,2,1]-bicycloheptane (OBH); and liquid ethers in the form of azaoxa-alkanes, aza-alkyloxacycloalkanes or oxa-alkylazacycloalkanes which can be represented by the formulae:

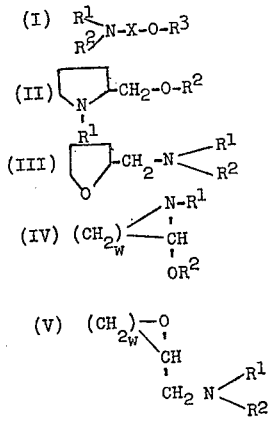

where $R^1$, $R^2$ and $R^3$ are the same or different alkyls each containing from 1 to 4 carbon atoms, namely, methyl, ethyl, n-propyl, isopropyl, n-butyl, isobutyl and t-butyl; X is a non-reactive group such as —$CH_2$—$CH_2$—

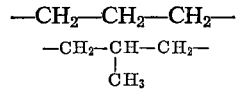

or other divalent aliphatic hydrocarbon or alkylene radicals, preferably containing from 2 to 4 carbon atoms; and $w$ is 1 to 4. Illustrative examples of such ethers include, for instance, 2-dimethylaminoethylmethyl ether

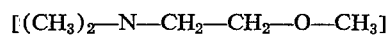

2-diethylaminoethylmethyl ether

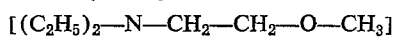

and 2-dimethylaminopropylmethyl ether $$[(CH_3)_2-N-CH_2-CH_2-CH_2-O-CH_3]$$

An illustrative dioxacycloalkane is 2,2'-di(tetrahydrofuranyl)

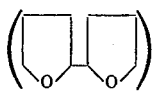

Outstandingly satisfactory for use in the practice of the present invention are the complexes of n-butyllithium with such ethers as are represented by the aforementioned Formula I, namely,

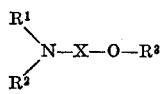

such as 2-dimethylaminoethylmethyl ether and 2-diethylaminoethylmethyl ether, and by the aforementioned Formula III. Such complexes produce extremely rapid telomerization rates. Those complexes of n-butyllithium with the Formula III ethers are also characterized by the sensitivity of their β-value.

$$\left(\beta = \frac{\text{rate of transfer}}{\text{rate of propagation}}\right)$$

to the variation of the ethylene pressure and temperature. Thus, unusually high melting and very hard waxy telomers can be obtained which, upon treatment with an aliphatic hydrocarbon solvent, lose their amorphous components and leave microcrystalline waxes having valuable properties and uses.

The proportion of the ethers to be added to the organolithium compounds employed in telomerization reactions, generally speaking, may vary from 0.25 to 25 moles of ether per mole of organolithium compound. The ether, by interaction with the organolithium compound, is believed to form a coordination complex which activates the organolithium compound. The catalyst can be preformed and then added to an aromatic hydrocarbon to be reacted or it can be formed in situ by adding the catalyst components to the aromatic hydrocarbon telogen.

Aromatic hydrocarbons which can be used as telogens in carrying out the method of the present invention include, by way of example, benzene, toluene, o-, m- and p-xylenes, mesitylene, durene, and polymethylbenzenes and polymethylpolyphenyl compounds in general; alkylbenzenes such as ethylbenzene, and isopropylbenzene and alkyl and polyalkylphenyls in general; naphthalene, methylnaphthalenes, cyclohexylbenzene, and the like. The term "aromatic hydrocarbon," as used herein, excludes the presence of unsaturated side chains attached to the aromatic nucleus. Other aromatic hydrocarbon telogens which can be used in the practice of the present invention are disclosed, for example, in the aforementioned U.S. Pat. No. 3,206,519.

In carrying out the method of the present invention, generally speaking, the organolithium compound is dissolved in an inert organic solvent, particularly a hydrocarbon solvent, and added to a solution of the ether in the aromatic hydrocarbon telogen. Various inert organic solvents can be utilized including, for instance, pentane, hexane, heptane, octane and isooctane, as well as mixtures thereof. The reaction mixture is then placed in a suitable heated reaction vessel where it is brought into contact with ethylene under pressure.

The reaction temperatures utilized may range from about 20° C. to 80° C., usually from about 40° to 60° C. The pressures employed in telomerization reactions carried out in accordance with the practice of this invention are of the order of 50 to 10,000 p.s.i.g., especially desirably from about 3,000 to 7,000 p.s.i.g.

Generally speaking, the following observations appear applicable:

(1) The telomer yield increases with the pressure of ethylene in an approximately linear fashion.

(2) The yield of telomer increases with increasing temperature up to about 90° C. Above this temperature, the yield tends to fall off, due, apparently, to the deterioration of the catalyst. Higher temperatures appear to favor somewhat chain transfer over chain propagation, resulting in a telomer with lower average molecular weight.

(3) The yield of telomer increases with increasing concentration of ether, e.g. tetrahydrofuran (THF), up to a certain limit, apparently due to two main reasons:

(a) The THF is kinetically involved in the reaction; and
(b) It increases the solubility of ethylene in the reaction medium. However, the rate of catalyst deterioration also increases with increasing concentration of THF and beyond a certain concentration limit becomes the predominant reaction.

(4) The amount of telomer produced per gram of organolithium, e.g. n-butyllithium, employed is generally relatively invariant, provided that the ratio of organolithium/ether is kept constant.

(5) The reaction appears to proceed rapidly in its early stages, then slows down and levels off at a later stage.

(6) The amount of catalyst within reasonable limits, does not appear to have any pronounced effect upon the yield of telomer.

(7) Catalyst decay or deterioration occurs over a period of time, the rate thereof being favored by higher temperatures. In certain cases, over a period of about 18 hours usage, slightly over 30% of the catalyst activity was found to be destroyed. Such decay or deterioration can, in general, be suppressed or reduced by keeping the ratio of the ether to the organolithium as small is is reasonably possible consonant with other considerations and/or by diluting the telogen with an aliphatic saturated hydrocarbon such as, for example, hexane or heptane.

(8) The wax is conveniently isolated by vacuum distillation of the "low boilers." The residue then is treated with boiling water to remove the yellow color and the odor and finally extracted with a solvent such as hexane to remove the amorphous components.

(9) The physical properties of the wax depend mainly on the telogen employed. Waxes derived from toluene and p-xylene are comparable. The wax derived from tetrahydronaphthalene possesses a uniquely high melting point and extremenly low needle penetration. The wax from benzene telogen appears to be essentially a low molecular weight polyethylene of highly crystalline character.

The following specific examples are given to illustrate both the preparation of the organolithium-ether catalyst systems and their use in carrying out telomerization reactions in accordance with the practice of this invention. Also, there are first set forth general exemplary runs, the procedures being applicable to the several specific examples. It will be understood that numerous other examples will readily occur to those skilled in the art in the light of the novel guiding principles and teachings disclosed herein.

Reactor: A stirred autoclave of 1000 ml. capacity was used (Parr A236HC10). The tetrahydrofuran and the telogens were dried over molecular sieves. The ethylene gas was CP grade.

EXEMPLARY RUNS

Example 1

(a) Telomerization.—220 ml. of benzene (dried over molecular sieves) was added to the cylinder of the pressure reactor followed by 41 ml. (0.5 mole) of anhydrous tetrahydrofuran. The cylinder and its contents weighed 3959 g. The reactor was assembled, and a slow stream of nitrogen was passed through the system using as gas inlet the "liquid sampling valve" and as gas outlet the "gas release valve" protected by a mineral oil bubbler. After about 0.25 hour, 50 ml. of 1.0 N n-butyllithium solution in benzene was introduced with a 50 ml. syringe through the "gas release valve," while the contents of the reactor were stirred. The two valves were closed and ethylene gas was admitted to the system.

| Time | Temp. (° C.) | Pressure (p.s.i.g.) |
|---|---|---|
| 10:45 | 30 | 700 |
| 10:55 | 40 | 780 |
| 11:00 | 48 | 900 |
| 11:20 | 54 | 960 |
| 11:35 | 57 | 980 |
| 11:57 | 56 | 950 |
| 12:00 | 55 | 940 |
| 12:30 | 55 | 940 |
| 1:00 | 55 | 940 |
| 1:37 | 55 | 930 |
| 1:50 | 55 | 930 |

The ethylene pressure was released through a trap cooled with a Dry Ice and acetone bath. The reactor was disassembled, the liquid collected in the trap; and the solids from the "head" of the reactor were transferred into the cylinder. The final weight of the cylinder was 3979 g. Net increase was 20 g., namely, the amount of ethylene reacted and/or dissolved. The reaction mixture was transferred in a distillation apparatus and the unreacted benzene as well as the THF were distilled off. The residue (telomer) weighed 52 g.

(b) Preparation of wax.—60 g. of telomer (from toluene) was subjected to vacuum distillation through short-path column until the flask rose to 250° C. and the temperature in the head of the column to 210° C. under a pressure of 3 mm. of Hg. The distillate, a clear liquid at room temperature, weighed 25 g. (42%) and it was found by VPC to have the following composition:

| | Percent |
|---|---|
| Toluene | 0.0 |
| n-Propylbenzene | 10.1 |
| n-Amylbenzene | 13.8 |
| n-Heptylbenzene | 16.1 |
| n-Nonylbenzene | 16.8 |
| n-Undecylbenzene | 16.9 |
| n-Tridecylbenzene | 14.8 |
| n-Pentadecylbenzene | 11.5 |
| | 100.0 |

14 g. from the residue (wax) were suspended in water and the mixture boiled until the yellowish color of the melted wax was extracted into the aqueous phase. The white wax was separated after cooling to room temperature and air-dried. The dry wax was transferred into the container of a "Waring Blendor," 130 ml. of pentane added and the mixture agitated for several minutes. The insoluble fraction of the wax was isolated by pressure-filtration and air dried. It weighed 6 g. (53%). The pentane-soluble material was found to be an unresolvable mixture of alkylbenzenes with 15–33 carbon atoms in the side (normal) chain. The wax exhibited the following characteristics:

| | |
|---|---|
| Congealing point, ° F. (D–938)[1] | 186 |
| Melting point, ° F. (D–127)[1] | 203.5 |
| Needle penetration: | |
| At 77° F. (D–1321)[1] | 5 |
| At 130° F. | 52 |
| ASTM color (D–1500)[1] | 0.5 |
| Saybolt viscosity: | |
| At 210° F., SUS | 64 |
| At 250° F., SUS | 51 |

[1] Standard ASTM test method.

(c) Isolation of wax (powder form).—The telomer from ethylene and benzene is a benzen-insoluble highly microcrystalline product of high melting point. The microcrystalline telomer can be isolated as a white powder by either filtration or by vacuum distillation of the benzene at room temperature. The microcrystals are washed with water, air-dried and extracted with hexane in order to remove the amorphous fraction. The dry product is a freely flowing white powder. The wax, in this form, is readily and conveniently compounded with other desired ingredients.

Example 2.—Preparation of benzyllithium-THF catalyst system 18 ml. (0.2 mole) of unsolvated sec-butyllithuim was dissolved in 180 ml. of toluene, the mixture cooled to −20° C. and 40 ml. (0.4 mole) of tetrahydrofuran (THF) added slowly at −15°±1° C. When about 30 ml. of the THF had been added (15 minutes) the temperature rose to 0° C. and the entire reaction mixture solidified to a yellow crystalline mass. The remainder of the THF was added all at once and the temperature of the reaction mixture allowed to rise gradually to room temperature. Most of the solid dissolved. A further addition of 10 ml. of THF completely solubilized the solid product. After 3 hours of stirring at room temperature, oxidimetric analysis of the solution indicated a yield of benzyllithium in solution of 95%, assuming that all of the sec-butyllithium had reacted during this time, either by forming benzyllithium or by cleaving the THF. The solution had a residual or non-carbon lithium active content of 0.07 N and an active carbon-lithium content of 0.9 N.

Example 3.—Telomerization of ethylene using toluene as telogen; benzyllithium-THF catalyst system 250 ml. of toluene was treated, under nitrogen, with a few cc. of benzyllithium solution to a permanent yellow color, and then transferred into a 1 liter stainless steel stirred autoclave. 50 ml. of a 0.5 N solution of benzyllithium (0.025 mole) in a 60:40 vol. percent cyclohexane-tetrahydrofuran mixture was then added to the autoclave as catalyst. Eethylene was admitted at 800 p.s.i.g., the temperature rising to 50° C. The temperature was kept at 50–51° C. and the reaction mixture stirred for 19 hours. The excess gas was vented. A test for active catalyst was negative. The mixture was shaken with about 10 ml. of water, filtered, and the filtrate condensed to a small volume. The precipitate, a white waxy material, was mixed with the rest of the product. Benzene was added and the mixture subjected to distillation until the pot temperature reached 140° C. The residue weighed 28 grams and on standing set into a solid waxy material. Of this, 15.8 grams was recovered toluene and 12.2 grams was telomers. The telomer distribution was as follows (as determined by vapor phase chromatography):

$C_3$–$C_7$ side chains—29.9% (fore-cut)
$C_9$–$C_{15}$ side chains—54.3% (mid-cut)
$C_{17}$–$C_{23}$ side chains—15.8% (waxes)
($C_{25}$ and above undetermined)

Example 4.—Telomerization of ethylene using toluene as telogen and n-butyllithium-THF as catalyst 250 ml. of toluene, 5 ml. of concentrated n-butyllithium (0.6 mole) (93%) in 95 ml. of toluene, and 20 ml. of THF (0.25 mole) was placed in a 1 liter stainless steel stirred autoclave, previously flushed with argon. Ethylene gas was pressured into the autoclave to 900 p.s.i.g. and the mixture stirred and heated at 50°±2° C. for 22 hours. After this time, the catalyst was found to still be active. The reactive product, a jelly-like material, was treated with moist pentane and then subjected to distillation. The residue boiling above 130° C. weighed 160 grams. Of this, 45 grams was toluene and 115 grams was telomers. The telomer distribution (as determined by vapor phase chromatography) was as follows:

$C_3$–$C_7$ side chains—36.7%
$C_9$–$C_{15}$ side chains—44.9%
$C_{17}$–$C_{23}$ side chains—18.5% (waxes)

Example 5.—Telomerization of ethylene using benzene as telogen and n-butyllithium-2-dimethylaminoethylmethyl ether as catalyst 270 ml. of benzene, 5 ml. of 2-dimethylaminoethylmethyl ether and 1 gram of n-butyllithium were placed in a 1,000 ml. autoclave. Ethylene was pumped into the autoclave and the ethylene pressure was adjusted at 550 p.s.i.g. and maintained within ±20 p.s.i. for 1 hour at 55° C. At the end of this period of time, the ethylene pressure was released and the contents of the autoclave were transferred into a distillation flask and distillation of the unreacted benzene was carried out. A congealed telomer-containing mass remained weighing about 45 grams which, upon cooling, solidified into a very hard wax. It was mixed with 150 ml. of hexane in a "Waring Blendor" and then filtered, leaving a microcrystalline waxy fraction weighing about 40 grams which exhibited the following characteristics.

| | |
|---|---|
| Congealing point, ° F. | 203.5 |
| Melting point, ° F. | 221 |
| Needle penetration: | |
| At 77° F. | 1.0 |
| At 130° F. | 25 |
| ASTM color | 0.5 |

Additional examples of the carrying out of telomerization for the production of microcrystalline waxes are shown in the following Tables I, II and III.

dried, and vacuum distilled (~1 mm.) to give 243 grams of wax and about 20 grams of low boilers (300° C.). The hard, opaque wax possessed physical properties essentially the same as in the wax produced by the procedure of Example 5 and appeared to be essentially a low molecular weight polyethylene of highly crystalline character.

The microcrystalline waxes of the foregoing examples are recovered by the procedures described in the foregoing exemplary runs.

Example 7.—Telomerization of ethylene using benzene as telogen and n-butyllithium to produce a microcrystalline wax To a 5000 p.s.i., 1-gallon stirred autoclave was charged 1,500 ml. of benzene dried over molecular sieves and 5 ml. of dimethylaminoethoxyethane (2-dimethylaminoethyl methyl ether). The autoclave was purged with nitrogen and then 3 grams of n-butyllithium was introduced. The reactor was pressurized with ethylene at 700 p.s.i. and gentle heating was applied until the temperature of the reactants rose to about 60° C. Heating was discontinued at this stage and the reaction was allowed to proceed spontaneously. The temperature rose to a maximum temperature of about 80° C. Stirring continued until the temperature dropped to room temperature (about 12 hours). During this period of time the pressure in the autoclave

TABLE I

| Example | Telogen (350 ml.) | Catalyst | Catalyst* | Reaction temp. (° C.) | Pressure range (p.s.i.g.) | Reaction time (hrs.) | Product (grams) |
|---|---|---|---|---|---|---|---|
| 6 | Toluene | n-BuLi:THF | 0.05:20 | 80±2 | 750-800 | 4 | 55 |
| 7 | do | Same as above | 0.05:20 | 110±4 | 800±20 | 2 | 89 |
| 8 | do | do | 0.025:20 | 40-42 | 800 | 4 | 15.5 |
| 9 | do | do | 0.025:20 | 50-55 | 800-900 | 4 | 22.0 |
| 10 | do | do | 0.025:20 | 80±3 | 800±50 | 4 | 52.5 |
| 11 | do | do | 0.075:30 | 50±2 | 800±20 | 4 | 29 |
| 12 | do | do | 0.05:50 | 60-67 | 800±30 | 4 | 75 |
| 13 | do | do | 0.25:10 | 80±2 | 800±20 | 3 | 38 |
| 14 | do | PhCH₂Li:THF | 0.25:40 | 80±5 | 800-860 | 3 | 50 |
| 15 | do | Same as above | 0.55:50 | 80±3 | 800 | 3 | 76 |
| 16 | p-Xylene | n-BuLi:THF | 0.05:50 | 60-62 | 800 | 5 | 83 |
| 17 | Toluene | {n-BuLi:THF / PhCH₂Li:THF} | {0.025:50 / 0.025:50} | 60-65 | 800 | 3 | 65 |

*Gram moles of organolithium to ml. of ether.

TABLE II

| Exp. No. | RLi | RLi (mole) | THF (mole) | RLi:THF | Benzene (mole) | BuLi:THF:PhH | Ethylene pressure (p.s.i.g.) | Temp. (° C.) | Time (hrs.) | Yield of telomer (grams)* |
|---|---|---|---|---|---|---|---|---|---|---|
| 18 | PhLi | 0.036 | 0.40 | 1:11 | 3 | 1:11:83 | 630-860 | 40-73 | 15 | 37 (15) |
| 19 | BuLi | 0.05 | 0.40 | 1:8 | 3 | 1:8:60 | 440-600 | 35-64 | 14 | 74 (50) |
| 20 | BuLi | 0.025 | 0.12 | 1:5 | 3 | 1:5:120 | 400-600 | 35-67 | 64 | 59 (30) |
| 21 | {BuLi / i-Bu₃-Al} | {0.05 / 0.025} | 0.5 | | | | 310-500 | 37-56 | 15 | 57 (20) |
| 22 | BuLi | 0.02 | 0.2 | 1:10 | **3 | 1:10:150 | ~500 | 50-55 | 42.5 | 64 (50) |

*Number in parentheses: Grams of ethylene reacted.
**Toluene.

TABLE III

| Example | BuLi (mole) | THF (mole) | Benzene (mole) | Toluene (mole) | p-Xylene (mole) | Tetralin (mole) | Ethylene pressure (p.s.i.g.) | Temp. (° C.) | Reaction time (hrs.) | Yield of telomer (grams) | Ethylene reacted (grams) |
|---|---|---|---|---|---|---|---|---|---|---|---|
| 23 | 0.05 | 0.5 | | 3.0 | | | 450-700 | 30-35 | 36 | 73 | 30 |
| 24 | 0.05 | 0.5 | | 3.0 | | | 650-800 | 30-85 | 16.5 | 155 | 96 |
| 25 | 0.05 | 0.5 | | | 2.4 | | 800-900 | 60-70 | 120 | 238 | 100 |
| 26 | 0.025 | 0.5 | | | 2.4 | | 800±100 | 60±5 | 70 | 83 | 50 |

Example 6.—Telomerization of ethylene using benzene as telogen and n-butyllithium to produce a microcrystalline wax 750 ml. of benzene, 60 ml. of THF, and 15 ml. of concentrated n-butyllithium (93%, 0.15 mole) were placed in a 1-gallon autoclave. Ethylene was pumped into the autoclave and the ethylene pressure adjusted to 750 p.s.i.g. at 20° C. The mixture was stirred at 1000 r.p.m. for 2.5 hrs. while the temperature was raised slowly to about 50° C. Heating and stirring (400 r.p.m.) were continued for 15 hrs. Heating was then discontinued until the temperature dropped to about 40° C. At the end of this period of time, the ethylene pressure was released and the contents of the autoclave were boiled with water, was reduced to about 100 p.s.i. The reaction mixture, a white solid, was freed from benzene by distillation, up to 165° C. (pot temperature). The residue, a cherry-brown melt, solidified into an off-white, hard mass weighing 440 grams. Yield of wax/gram of n-BuLi=147 g.

It has also been found that, through the utilization of certain techniques, good recovery of the catalyst, especially in the case of the n-butyllithium-tetrahydrofuran complex, can be effected at the end of the telomerization process. Tetrahydrofuran forms soluble complexes with benzyllithium and the other lower members of the series $C_6H_5(CH_2)_nCH_2Li$. On the other hand, under low ethylene pressure only low molecular weight telomers are formed. This means that the catalyst exists in the reaction mixture as No. 2 below, namely, in a soluble form.

Hence, if, at the end of the telomerization reaction, the ethylene pressure is reduced to about zero or to about 100 to 200 p.s.i.g. and the reaction mixture is heated for several hours at about 50° C., the lithium originally attached to the end of a chain is transferred to a molecule of the telogen.

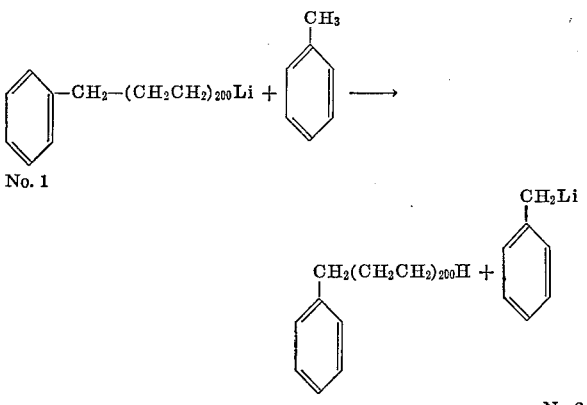

No. 1

No. 2

The foregoing type of procedure is especially applicable with any telogen which is susceptible to metallation as, for instance, toluene, xylenes and tetrahydronaphthalene. It is also applicable in the case of benzene as the telogen where the telomerization is carried out under conditions where the formation of short chain alkylbenzenes occurs.

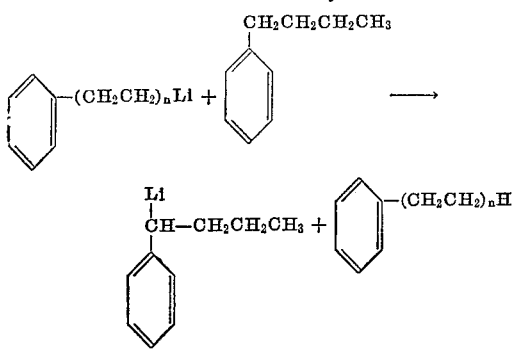

This catalyst recovery technique essentially involves one filtration in an inert atmosphere. The filtrate contains the catalyst, the unreacted telogen as well as the soluble fraction of the telomers. The catalyst loss (by cleavage) in the filtrate is made up and the solution is recycled.

It may also be pointed out that the foregoing catalyst recovery technique is also applicable to the recovery of organolithium-amine complexes, such as are disclosed in U.S. Pat. No. 3,206,519.

The physical properties of the microcrystalline waxes will vary depending upon the particular telogen utilized. Illustrative of this effect is the following wherein microcrystalline waxes were derived from tetrahydronaphthalene (1), toluene (2) and p-xylene (3):

|  | 1 | 2 | 3 |
| --- | --- | --- | --- |
| Congealing point, °F | 217.0 | 186.0 | 199.0 |
| Melting point, °F |  | 203.5 | 215.0 |
| Needle penetration at: |  |  |  |
| 77° F | 0.5 | 5 | 5 |
| 130° F | 8 | 52 | 45 |
| ASTM color | 4.0 | 0.5 | 0.5 |
| Saybolt viscosity at: |  |  |  |
| 210° F. SUS |  | 64 | 86 |
| 250° F. SUS | 129 | 51 | 59 |
| Acid number, MG KOH |  |  |  |
| Saponification Number, MG KOH |  |  |  |

What is claimed is:

1. A method of producing microcrystalline waxes which comprises contacting ethylene with (a) an aromatic hydrocarbon telogen and with (b) an organolithium compound selected from the group consisting of alkyllithiums, cycloalkyllithiums, alkylenedilithiums, and dilithio adducts of conjugated polyene hydrocarbons, in the presence of a linear alkyl ether or a cyclic alkyl ether, the mole ratio of the organolithium compound to the ether being about 1 mole of the former to from about 0.25 to 25 moles of the latter, at a temperature in the range of about 20° C. to about 110° C. and under a pressure of at least 500 p.s.i.g.

2. A method according to claim 1, wherein the organolithium compound is n-butyllithium and the ether is tetrahydrofuran.

3. A method according to claim 2, wherein the telogen is benzene and/or toluene.

References Cited

UNITED STATES PATENTS 2,377,779   6/1945   Hanford et al. _____ 260—94.9

FOREIGN PATENTS 1,051,269   12/1966   Great Britain _____ 260—94.9

OTHER REFERENCES

Butte, W. A., Hydrocarbon Processing, vol. 45, No. 9, September 1966, pp. 277–280.

JOSEPH L. SCHOFER, Primary Examiner

E. J. SMITH, Assistant Examiner

U.S. Cl. X.R.

252—431 R, 431 N; 260—94.9 F, 671 R